United States Patent
Kaeppler et al.

(10) Patent No.: US 6,197,914 B1
(45) Date of Patent: Mar. 6, 2001

(54) METHOD FOR PREPARING POLYORGANOSILOXANE RESINS THAT CONTAIN MONO-AND TETRAFUNCTIONAL UNITS

(75) Inventors: Klaus Kaeppler; Robert Lehnert, both of Dresden; Sabine Hoffmann, Radebeul; Toni Schoeley, Diera-Zehren, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/220,053

(22) Filed: Dec. 23, 1998

(30) Foreign Application Priority Data

Jan. 2, 1998 (DE) ................................ 198 00 021

(51) Int. Cl.$^7$ .................................................. C08G 77/20
(52) U.S. Cl. ............................ 528/32; 524/837; 524/858; 525/474; 525/477; 528/12; 528/31; 528/33; 528/34; 528/39
(58) Field of Search ..................................... 524/837, 856; 525/474, 477; 528/12, 31, 32, 33, 34, 39

(56) References Cited

U.S. PATENT DOCUMENTS

| 2,857,356 | * | 10/1958 | Goodwin. | |
| 5,110,890 | * | 5/1992 | Butler | 528/12 |
| 5,548,053 | * | 8/1996 | Weidner et al. | 528/14 |

FOREIGN PATENT DOCUMENTS

| 0 389 138 | 9/1990 | (EP). |
| 0 604 847 | 7/1994 | (EP). |
| 0 610 818 | 8/1994 | (EP). |

* cited by examiner

*Primary Examiner*—Robert Dawson
*Assistant Examiner*—Jeffrey B. Robertson
(74) *Attorney, Agent, or Firm*—Oblon, Spivak, McClelland, Maier & Neustadt, P.C.

(57) ABSTRACT

The present invention relates to a method for preparing a polyorganosiloxane, that contains mono- and tetrafunctional units, by hydrolysis and condensation of mixtures of alkyl silicates and alkylsilanes and/or their hydrolyzates and compounds containing SiCl groups.

7 Claims, No Drawings

METHOD FOR PREPARING POLYORGANOSILOXANE RESINS THAT CONTAIN MONO-AND TETRAFUNCTIONAL UNITS

BACKGROUND OF THE INVENTION

1. Filed of the Invention

This invention relates to a method for preparing a polyorganosiloxane that contains mono- and tetrafunctional units, by hydrolysis and condensation of a mixture of alkyl silicates and alkylsilanes and/or their hydrolyzates and compounds containing SiCl groups.

2. Discussion of the Related Art

Methods for preparing polyorganosiloxanes that consist of monofunctional M-units ($R_3SiO_{1/2}$) and tetrafunctional Q-units ($SiO_{4/2}$) are known. Most of the methods use tetraalkyl silicates as the source of Q-units. The M-units are usually introduced in the form of hydrolyzable trialkylsilanes. The hydrolysis/condensation reaction taking place must be catalyzed in order to obtain the desired products. Acidic compounds have proved to be especially suitable for that purpose. The reaction is usually carried out in an organic solvent. A method described in U.S. Pat. No. 2,857,356 starts with a mixture of tetraalkyl silicate and a trialkylchlorosilane in a solvent immiscible with water, and the mixture is reacted with water, with the resin solution being separated from the alcoholic hydrochloric acid by phase separation. The reaction is difficult to control because of the two-phase system. Additional drawbacks include the production of large amounts of concentrated alcoholic hydrochloric acid and the shift of the stoichiometric balance by the formation of volatile byproducts, and the siloxanes containing Q-units dissolved in the aqueous hydrochloric acid. The resins contain a large fraction of OH groups bonded to silicon.

To minimize the production of alcoholic hydrochloric acid, the use of a trialkylalkoxysilane and/or of its disiloxane and aqueous hydrochloric acid instead of trialkylchlorosilanes is proposed in EP 195 936. In this case, the alkyl silicate is added to the heterogeneous mixture of silanes and hydrochloric acid. Usable products are obtained by this method when the mixture contains at least 5 wt. % HCl. For this reason, hydrochloric acid with at least 10 wt. % hydrogen chloride has to be used. Volatile oligomers are also formed, which adversely affect the stoichiometric balance. Since the system is heterogeneous throughout the entire time of reaction, the reaction is difficult to control.

For this reason, it has been suggested to react triorganoalkoxysilanes and/or their hydrolyzates with tetraalkyl silicates in the presence of strongly active catalytic compounds, which can then be used in smaller amounts. Thus, EP 529 547 describes the use of alkyl silicate and disiloxane in combination with a strong proton acid, such as a sulfuric or phosphoric acid, with concentrated hydrochloric acid as catalyst. EP 294 277 uses a sulfonic acid and phosphonitrile chloride for the reaction of alkyl silicates with oligomeric siloxanes. In EP 604 847, a multi-proton acid, preferably sulfuric or phosphoric acid, is used, which is neutralized in several stages. Again, EP 640 109 describes the use, in particular, of hydrochloric acid, but only in catalytic amounts (preferably 0.2 to 50 mmoles based on 1000 g of reaction mixture), which usually makes it possible to carry out the procedure in a homogeneous phase. The infeed (addition) of small amounts of hydrochloric acid, and especially its homogeneous distribution in the reaction mixture, seems to be a problem (in Example 1, 1.9 g of 20% hydrochloric acid is used in relation to 1475 g of reaction mixture), since, according to EP 640 109, homogeneity is not achieved when the acid concentration is raised.

The critical drawback to such methods, in which the catalytically active compounds are fed into the silane and/or siloxane mixture, consists of the fact that partially high catalyst concentrations occur at the point of infeed, either because of the insolubility of water or aqueous acids in the siloxanes used, or because of the usual infeed, which leads to uncontrollable reactions taking place at this point. The catalyst can be distributed through the entire reaction mixture only after the formation of silanols with solubilizing action, and the catalyst is present in the specified (average) concentration only thereafter.

SUMMARY OF THE INVENTION

The purpose of this invention is to make available a method for preparing polyorganosiloxanes that contain mono- and tetrafunctional units that guarantees very good reproducibility, that starts with tetraalkyl silicate and alkylalkoxysilanes and/or their hydrolyzates, and that avoids locally high catalyst concentrations.

The object of the invention is a method for preparing polyorganosiloxanes that contain mono- and tetrafunctional units that is characterized by the fact that in step 1, a mixture of (a) at least one silane with the formula:

$$Si(OR)_4 \tag{I},$$

wherein R can be identical or different and represents a monovalent alkyl group with 1 to 4 carbon atoms, or its partial hydrolyzate, (b) at least one silane with the formula:

$$R^1{}_3SiOR \tag{II},$$

and/or its hydrolyzate with the formula:

$$R^1{}_3SiOSiR^1{}_3 \tag{III},$$

wherein R has the meaning given above and $R^1$ can be identical or different, and represents for hydrogen, branched and/or unbranched, saturated and/or unsaturated, substituted and/or unsubstituted, linear, cyclic, aliphatic, and/or aromatic hydrocarbon groups with 1 to 18 carbon atoms; and (c) at least one monomeric and/or oligomeric compound that has at least one SiCl group, is reacted with the equivalent amount of water based on the hydrolyzable groups and then in step 2, an aqueous alcohol phase is separated from the homogeneous reaction mixture obtained by adding water and/or a solvent immiscible with water.

DESCRIPTION OF THE PREFERRED EMBODIMENTS

The monomeric compound that has at least one SiCl group can conform to the formula:

$$R^1{}_ySiCl_{4-y} \tag{IV},$$

wherein $R^1$ has the meaning given above and y is a number between 0 and 3, and wherein preferred $R^1$ groups are methyl, vinyl, or ethyl groups, for example with silicon tetrachloride, methylvinyldichlorosilane, and/or trimethylchlorosilane, or other trialkylchlorosilanes being used, whose alkyl groups can be long-chained and/or substituted.

The oligomeric compound that has at least one SiCl group can conform to the formula:

$$Cl_a(R^1)_{3-a}Si(OSiR^1{}_2)_mOSi(R^2)_{3-b}Cl_b \quad (V),$$

wherein $R^2$ represents trimethylsiloxy or alkyldimethylsiloxy groups, wherein the alkyl group may contain $OR^1$ and/or $R^1$ substituents, "m" has a value between 0 and 1,000, and "a" and "b", independently of one another, have values between 0 and 3, provided that (a+b) is at least 1. The $R^1$ in this case is an alkyl group such as methyl, vinyl, or ethyl group, with methyl group being particularly preferred. For example, bis(trimethylsiloxy)methylchlorosilane or tris(trimethylsiloxy)chlorosilane can be used, or also a tetramethyldichlorosilane or a linear siloxane with dimethylchlorosiloxy end groups.

The content of Cl groups bonded to silicon in the starting mixture is preferably from 0.1 to 5 wt. %.

No infeed of acidic catalyst is necessary in the method of the invention. The catalyst needed for the hydrolysis and/or condensation is formed in situ with the addition of water, by hydrolysis of the SiCl groups. Since the concentration of SiCl groups in the starting mixture is low compared to the amounts of silanes used, and they are accordingly distributed homogeneously, it is possible to make the reaction take place controllably by the rate of water addition, and thus to control it.

Tetraalkoxysilanes, for example, tetraethoxysilane, and/or its commercial partial hydrolyzates, for example, with an $SiO_2$ content of 40 wt. %, are preferably used as silane (a) with the formula (I) that forms Q-units.

Trialkylalkoxysilanes in which the trialkylsilyl group, for example, represents a trimethyl-, dimethylvinyl-, and/or dimethylhydrogensilyl group, or their hydrolyzates, and/or hexaalkyldisiloxanes or vinylalkyldisiloxanes are preferably used as silane (b) with the formulas (II) and (III) that form M-units.

The ratio of silane (a) to silane (b), i.e. the ratio of Q-units to M-units, depends on the desired end products. It is usually in the range of 0.25 to 2.00.

Difunctional (D)-units and/or trifunctional (T)-units can likewise be incorporated in the resin with the method of the invention. In this case also, their amount and functionality depend on the later application. Fractions of the desired units can be included in the reaction mixture just by selecting the compounds that have SiCl groups, for example when methylvinyldichlorosilane (D-unit) or methyltrichlorosilane (T-unit) are used as compounds that have SiCl groups. In the same way, it is possible by selective choice of the compounds that have SiCl groups to incorporate groups in the resin that could otherwise be incorporated only by an additional procedural step, for example equilibration.

Another possibility for introducing D- or T-units into the resin is the addition of selected silanes to the starting mixture. Preferably, at least one silane with the formula:

$$R^1{}_xSi(OR)_{4-x} \quad (VI),$$

wherein $R^1$ and R have the meanings given above and x is either 1 or 2; and/or the partial hydrolyzate of silane of formula VI, is added, with amounts of 0.01 to 10 wt. % being preferred in the starting mixture. It is also possible here to incorporate functional groups selectively in the resin, for example vinyl groups. Compounds preferably used are diorganodialkoxysilanes and/or organotrialkoxysilanes, wherein the organo groups can be saturated or unsaturated, substituted or unsubstituted groups, for example methyl, ethyl, vinyl, n-propyl, i-butyl, n-octane, hexadodecyl, cyclohexyl, cyclopentyl, 3-aminopropyl, 3-methacryloxypropyl, 3-glycidoxypropyl, 3-mercaptopropyl, or tridecafluorooctyl groups.

The reaction of the silane mixture with the stoichiometric amount of water occurs in a homogeneous phase. By adding excess water and/or water with immiscible solvent, the reaction mixture obtained is then separated into two phases, an aqueous alcohol phase and a phase containing the resin. The phase separation is not at all critical. Thus, separation into two phases can be achieved by adding water alone. It is also possible to add water and small amounts of solvent immiscible with water or the solvent can be added first and then water. After the aqueous alcohol phase has separated, the resin can thus be present with no solvent or in the form of a solution.

The polyorganosiloxane resin present with no solvent can then likewise be dissolved in a solvent and, preferably, the water it contains is removed, usually by azeotropic distillation, and the solid is removed, usually by filtration or centrifugation, with a ready-to-use resin solution being obtained, or a condensation occurs in an additional step, similarly to the resin present in solution.

Examples of the solvents used are aromatics such as toluene and/or xylene, or aliphatic hydrocarbons such as hexane and/or heptane. In any case, it is desirable to choose a solvent that forms an azeotrope with water, to make it possible to remove water from the resin.

The polyorganosiloxane resin present in the form of an organic solution, in step 3, is adjusted to a pH greater than 7 by adding a basic compound and condensed with separation of an alcohol/water/solvent mixture, and the product obtained then, in step 3, is neutralized by adding an acid and/or a compound that splits off an acid, and then any water it may still contain and a portion of the solvent is removed, and insoluble constituents are separated.

The condensation is preferably carried out in the pH range of 8 to 10 and at reflux temperatures, for example in the range between 100 and 160° C. Preferred catalysts to be used can be any compounds known for this reaction; it is preferred to use alkali metal hydroxides such as sodium or potassium hydroxide, or amines such as methylamine, ethylamine, ammonium compounds, or hexaalkyldisilazanes. Hydrochloric acid is ordinarily used for the neutralization. Water is advantageously removed again azeotropically after the neutralization, and insoluble constituents, generally salts formed by the neutralization, are removed. Finally, the resin solution can be adjusted to the desired concentration with solvent, and it is then ready for use.

One possible use of the polyorganosiloxane resin, pursuant to the invention, after completion of the condensation, is blending it with a liquid polyorganosiloxane. To this end, the polyorganosiloxane resin solution obtained after the 4th step; in step 5, is mixed with at least one organosilicon compound with the formula:

$$R^1R^3R^4SiO-(R^1{}_2SiO)_n-SiR^1R^3R^4 \quad (VII)$$

and/or
with at least one organosilicon compound with the formula:

$$(R^1{}_2SiO)_p \quad (VIII),$$

wherein $R^3$ and $R^4$, independent of one another, is OH, OR or $R^1$, and $R^1$ has the meanings given above, "n" has a value between 0 and 5000, and "p" has a value between 3 and 8, and the solvent is then removed completely.

It is preferred to use organosilicon compounds that have a viscosity between 10 and 100,000 mPa·s. The compounds can contain crosslinkable groups on the silicon, for example, vinyl, OH, methoxy, ethoxy, and/or acetoxy groups, or hydrogen.

In the step 1, the starting materials are mixed in the desired ratio, for example tetraalkyl silicate, hexaalkyldisiloxane, and compounds that have SiCl groups such as trimethylchlorosilane, and optionally other alkoxysilanes. The amount of water necessary for the hydrolysis of all of the SiOR and/or SiCl bonds is then fed into the mixture slowly with stirring. The reaction temperature should be 50 to 70° C. A homogeneous mixture is obtained. After all the water has been added, the mixture is heated for about 2 hours longer under reflux to complete the reaction. It is also possible to operate under pressure.

It is then possible in step 2, to separate the homogeneous reaction mixture obtained, into two phases by adding water and to separate out the aqueous alcohol phase. This has the advantage that the volume of the mixture is small during the phase separation, and also the aqueous phase contains no organic solvent and thus little dissolved organosilicon compound. The resin phase, remaining after separation of the aqueous phase, is dissolved in solvent immiscible with water, for example toluene, and can then either be used immediately after removal of water and solids, as described below under (a) (the resin contains 1.5 to 5 wt. % silicon-bonded OH groups and 2 to 5 wt. % silicon-bonded OR groups), or it can be condensed as described under (b).

In step 2, it is also possible to separate the released alcohol from the homogeneous mixture, by stirring first with solvent immiscible with water, such as toluene, and then adding water. The amount of solvent and of water is usually 20 to 120 wt. % based on the homogeneous reaction mixture after the reaction. The mixture separates into an aqueous ethanol phase and an organic phase. It is possible, by selective addition of water and solvent to vary the densities of the phases so that the aqueous phase is either the upper or the lower phase. The resin phase obtained can be further processed in various ways.

(a) Water is removed from the resin phase by azeotropic distillation and, at the same time, the desired final concentration is reached; it is then filtered. A polyorganosiloxane with 1.5 to 5 wt. % silicon-bonded OH groups and 2 to 5 wt. % silicon-bonded OR groups is then obtained as a clear solution.

(b) In step 3, a condensation of the resin can be carried out with the objective of reducing the contents of OH and OR groups. To this end, the resin phase is adjusted to a pH between 8 and 10 by adding caustic soda solution or caustic potash solution and solvent is removed until a resin concentration of 60 to 95 wt. % is reached. Water of condensation, alcohol, and solvent are then removed by means of a water separator over a period of several hours with pot temperatures above 100° C., preferably 120 to 160° C.

Then, in step 4, the mixture is neutralized by adding hydrochloric acid in portions with stirring, for which the concentration of hydrochloric acid can be chosen arbitrarily and the mixture is heated again for 1 to 2 hours on a water separator to remove water and alcohol. The insoluble constituents such as the salts formed by neutralization, for example, are then removed from the resin solution obtained by filtration or centrifugation. The polyorganosiloxane resin obtained has less than 1 wt. % silicon-bonded OH groups and less than 2 wt. % silicon-bonded OR groups, and is present as a clear solution. It is also completely soluble in organosilicon polymers and other organic solvents such as acetone, naphthas, aromatics, or alcohols, for example.

The polyorganosiloxane resin solution prepared, according to the invention, can be further processed in various ways. In one such embodiment, the resin solution is adjusted to a ready-to-use concentration with the appropriate solvent. In another embodiment, the solvent is completely removed, whereby a solvent-free resin is obtained which is liquid to solid at room temperature, depending on the M/Q ratio. The resin solution can also be blended with a polyorganosiloxane in step 5, and any solvent still present can be removed. Examples of polyorganosiloxanes that can be used are a linear polydimethylsiloxane with vinyl, OH, or OR end groups with a viscosity between 10 and 100,000 mPa·s, or a cyclic organosilicon compound that consists of $((CH_3)_2SiO)_p$ units, with "p" having a value between 3 and 8, preferably between 4 and 6.

The advantage of the method, pursuant to the invention, consists especially of the fact that partially high catalyst concentrations at the point of infeed are avoided during the hydrolysis/condensation reactions. Because of the use of compounds containing SiCl groups that are distributed throughout the entire starting mixture, an extremely low concentration of acid can be achieved at the point of water infeed. Because of this it is possible both to keep the proportion of low molecular weight siloxanes low and to obtain a narrow molecular weight distribution in the end product and to reduce the proportions of high molecular weight and/or insoluble byproducts.

The polyorganosiloxanes, pursuant to the invention, can be used, among other applications, as transparent reinforcement resins in rubber, in defoaming formulations, as additives in coating materials, to prepare paper-impregnating agents, and to prepare pressure-sensitive silicone adhesives.

Having generally described this invention, a further understanding can be obtained by reference to certain specific examples which are provided herein for purposes of illustration only and are not intended to be limiting unless otherwise specified.

The following Examples are also recited in the priority document, German patent application P 198 00 021.9, filed Jan. 2, 1998, which is incorporated herein by reference in its entirety.

EXAMPLES

In the Examples below "RTV" refers to "room temperature vulcanizing"; "RTV2" refers to "room temperature vulcanizing two-component system"; "RTV2" refers to "addition-cured room temperature vulcanizing two-component system"; and "RTV2-Cond" refers to "condensation-cured room temperature vulcanizing two-component system".

Example 1

130 g of water was fed over a period of 3 hours into a mixture of 362 g (1.74 moles) of tetraethoxysilane, 127 g (0.78 mole) of hexamethyldisiloxane, and 19 g (0.18 mole) of trimethylchlorosilane with a pot temperature of 70° C. The mixture was then boiled under reflux for 2 hours. 100 g of toluene and 70 g of water were then added with stirring and the upper aqueous phase (450 g, 1.3 wt. % hydrogen chloride, density: 0.88 g/cm$^3$) was separated. 70 g of distillate was taken from the toluene resin solution (density: 1.00 g/cm$^3$), and the solution was then filtered. 287 g of a resin solution was obtained, containing 80 wt. % siloxane. The yield was 93%. The resin contained 1.4 wt. % silicon-bonded OH groups and 2.5 wt. % silicon-bonded ethylene oxide (EtO) groups. The molecular weights measured by gel permeation chromatography (GPC) (polystyrene standard) were 2000 g/mole for Mw and 1516 g/mole for Mn.

Example 2

130 g of water was fed over a period of 1 hour into a mixture of 362 g (1.74 moles) of tetraethoxysilane, 185 g (1.57 moles) of trimethylethoxysilane, and 19 g (0.18 mole) of trimethylchlorosilane with a pot temperature of 70° C. The mixture was then boiled for 3 hours under reflux. 100 g of toluene and 70 g of water were then added with stirring and the upper aqueous phase (500 g, 1.3 wt. % hydrogen chloride, density 0.89 g/cm$^3$) was separated. 80 g of distillate was taken from the toluene resin solution and the solution was then filtered. 273 g of a resin solution was obtained, containing 80 wt. % siloxane. The yield was 88%. The resin contained 1.2 wt. % silicon-bonded OH groups and 2.6 wt. % silicon-bonded ethylene oxide (EO) groups. The molecular weights measured by gel permeation chromatography (GPC) (polystyrene standard) were 1618 g/mole for Mw and 1371 g/mole for Mn.

Example 3

32 kg of water was fed over a period of 2 hours with stirring into a mixture of 90 kg (0.43 kmole) of tetraethoxysilane, 26.1 kg (0.16 kmole) of hexamethyldisiloxane, and 5 kg (0.05 mole) of trimethylchlorosilane with a pot temperature of 70° C. The mixture was then boiled for 2 hours under reflux and then 110 kg of toluene and 190 kg of water were added with stirring. The lower aqueous phase (280 kg, 0.7 wt. % hydrogen chloride, density: 0.97 g/cm$^3$) was separated and then 90 kg of distillate was taken from the remaining toluene resin solution. After filtration, 66 kg of a resin solution was obtained, containing 73 wt. % siloxane. The yield was 86%. The resin contained 1.7 wt. % silicon-bonded OH groups and 2.6 wt. % silicon-bonded ethylene oxide (EtO) groups. The molecular weights measured by gel permeation chromatography (GPC) (polystyrene standard) were 1550 g/mole for Mw and 1234 g/mole for Mn.

Example 4

125 g of water was fed over a period of 1 hour with stirring into a mixture of 354 g (1.7 moles) of tetraethoxysilane, 17.4 g (0.09 mole) of 1,3-divinyltetramethyldisiloxane, 111 g (0.69 mole) of hexamethyldisiloxane, and 19 g (0.18 mole) of trimethylchlorosilane with a pot temperature of 70° C. The mixture was then boiled under reflux for 2 hours. 400 g of toluene and 625 g of water were then added and the lower aqueous phase (965 g, 0.6 wt. % hydrogen chloride, density: 0.96 g/cm$^3$) was separated. 0.5 g of 25% sodium hydroxide solution was then added to 620 g of the toluene resin solution (density: 0.94 g/cm$^3$) and 185 g of distillate was taken off over a period of 1 hour. The mixture was then boiled on a water separator for 1 hour longer with a pot temperature of 120° C., with 15 g of distillate being obtained. The mixture was then neutralized by adding 20% hydrochloric acid in portions, and 20 g additional distillate was taken off on a water separator. After filtration, 400 g of a toluene resin solution was obtained with a siloxane content of 60 wt. %. The yield was 95%. The resin contained 1.0 wt. % silicon-bonded OH groups, 2.0 wt. % silicon-bonded ethylene oxide (EtO) groups, and had 1.75% wt. % vinyl groups. The molecular weights measured by gel permeation chromatography (GPC) (polystyrene standard) were 1681 g/mole for Mw and 1380 g/mole for Mn.

Comparison Example 5

123 g of water was fed over a period of 1 hour with stirring into a mixture of 354 g (1.7 moles) of tetraethoxysilane, 15.8 g (0.08 mole) of 1,3-divinyltetramethyldisiloxane, 125.3 g (0.77 mole) of hexamethyldisiloxane, and 32.4 g of 20% hydrochloric acid (corresponding to 0.18 mole of hydrogen chloride), with a pot temperature of 70° C. The mixture was then boiled under reflux for 2 hours. 450 g of toluene and 680 g of water were then added with stirring, and the lower aqueous phase (1130 g, 0.6 wt. % hydrogen chloride) was separated. The upper (538 g), very cloudy organic phase was filtered and then had a concentration of 23 wt. % siloxane. After taking off 358 g of distillate, 170 g of a resin solution with 75 wt. % siloxane was obtained. The yield was 50%. The resin contained 1.2 wt. % silicon-bonded OH groups and 2.6 wt. % silicon-bonded EtO groups. The molecular weights measured by gel permeation chromatography (GPC) (polystyrene standard) were 1240 g/mole for Mw and 1070 g/mole for Mn.

Example 6

70 g of water was fed over a period of 1 hour with stirring into a mixture of 253 g (0.34 mole) of a partial hydrolyzate of tetraethoxysilane with an SiO$_2$ content of 40 wt. %, 15.8 g (0.08 mole) of 1,3-divinyltetramethyldisiloxane, 111 g (0.69 mole) of hexamethyldisiloxane, and 19 g (0.18 mole) of trimethylchlorosilane, with a pot temperature of 70° C. The mixture was then boiled under reflux for 2 hours. 450 g of toluene and 730 g of water were then added with stirring, and 1490 g of aqueous phase was separated. 0.7 g of 25% sodium hydroxide solution was then added to 745 g of the toluene resin solution and 280 g of distillate was taken off over a period of 2 hours. The mixture was then boiled on a water separator for 1 hour up to a maximum pot temperature of 120° C., with 20 g of distillate being obtained. The mixture was then neutralized with 20% hydrochloric acid added in portions and 20 g of distillate was taken off over a period of 30 minutes with a pot temperature of 120° C. After filtration, 350 g of a toluene resin solution was obtained, with a siloxane content of 60 wt. %. The yield was 90%. The resin contained 1.7 wt. % silicon-bonded OH groups and 3.0 wt. % silicon-bonded EtO groups. The molecular weights measured by gel permeation chromatography (GPC) (polystyrene standard) were 2326 g/mole for Mw and 1488 g/mole for Mn.

Example 7

123 g of water was fed over a period of 1 hour with stirring into a mixture of 354 g (1.7 moles) of tetraethoxysilane, 17.4 g (0.09 mole) of 1,3-divinyltetramethyldisiloxane, 111 g (0.69 mole) of hexamethyldisiloxane, and 19 g (0.18 mole) of trimethylchlorosilane, with a pot temperature of 70° C. 450 g of xylene and 670 g of water were then added with stirring and 1030 g of the lower aqueous phase (density 0.97 g/cm$^3$) was separated. 0.97 g of 25% sodium hydroxide solution was then added to 710 g of the xylene resin solution (32 wt. % siloxane), and 367 g of distillate was taken off over a period of 1 hour. The mixture was then heated on a water separator up to a maximum pot temperature of 140° C., whereby 20 g of distillate was obtained and then 20% hydrochloric acid was added in portions for neutralization and an additional 20 g of distillate was taken off. After filtration, 325 g of a resin solution in xylene was obtained, with a siloxane content of 70 wt. %. The yield was 94%. The resin contained 0.52 wt. % silicon-bonded OH groups and 2.0 wt. % silicon-bonded EtO groups. The molecular weights measured by gel permeation chromatography (GPC) (polystyrene standard) were 2909 g/mole for Mw and 2367 g/mole for Mn.

Example 8

280 g of water was fed over a period of 1 hour with stirring into a mixture of 784 g (3.8 moles) of tetraethoxysilane, 31.3 g (0.168 mole) of 1,3-divinyltetramethyldisiloxane, 154 g (0.95 mole) of hexamethyldisiloxane, and 39 g (0.36 mole) of trimethylchlorosilane, with a pot temperature of 70° C. The mixture was then boiled under reflux for 2 hours. 900 g of water was then added with stirring and 1625 g of the upper aqueous phase (density 0.95 g/cm$^3$) was separated. The resin phase was then dissolved in 450 g of xylene, made alkaline with 2.6 g of 25% sodium hydroxide solution and 363 g of distillate was taken off over a period of 1 hour. The mixture was then boiled on a water separator for 4 hours up to a maximum pot temperature of 142° C., with 10 g of distillate being obtained and was then neutralized by adding 20% hydrochloric acid in portions and an additional 10 g of distillate was taken off. After filtration, 527 g of a resin solution in xylene was obtained, with a siloxane content of 70 wt. %. The yield was 83%. The resin contained 0.49 wt. % silicon-bonded OH groups and 2.0 wt. % silicon-bonded EtO groups. The molecular weights measured by gel permeation chromatography (GPC) (polystyrene standard) were 4100 g/mole for Mw and 3367 g/mole for Mn.

Example 9

32 kg of water was fed over a period of 2 hours with stirring into a mixture of 90 kg (0.43 kmole) of tetraethoxysilane, 4.3 kg (0.02 kmole) of 1,3-divinyltetramethyldisiloxane, 22.3 kg (0.14 kmole) of hexamethyldisiloxane, and 5 kg (0.05 kmole) of trimethylchlorosilane. The mixture was then boiled for 2 hours under reflux. 110 kg of toluene and 190 kg of water were then added with stirring and the lower aqueous phase (280 kg, 0.6 wt. % hydrogen chloride, density: 0.96 g/cm$^3$) was separated. 0.24 kg of 21% sodium hydroxide solution was then added to the toluene resin solution (density: 0.94 g/cm$^3$), 83.1 kg of distillate was taken off over a period of 2 hours and the mixture was then boiled for 2 hours at this temperature on a water separator with the removal of 0.1 kg of distillate. The mixture was then neutralized by adding 0.145 kg of 32% hydrochloric acid in portions, and about 0.1 kg of additional distillate was removed by boiling under re-flux on a water separator. After filtration, 91 kg of a toluene resin solution was obtained, with a siloxane content of 67 wt. % and a viscosity of 7 mPa·s at 25° C. The yield was 91%. The resin contained 0.9 wt. % silicon-bonded OH groups and 1.8 wt. % silicon-bonded EtO groups and had a vinyl content of 2 wt. %. The molecular weights measured by gel permeation chromatography (GPC) (polystyrene standard) were 2240 g/mole for Mw and 1788 g/mole for Mn.

Example 10

Preparation of a mixture of 25 wt. % polyorganosiloxane resin from Example 9 and 75 wt. % of a polydimethylsiloxane with vinyldimethylsiloxy end groups:

100 g of the 67% QMM$^V$ resin solution in toluene obtained in Example 9 was mixed with 200 g of a polydimethylsiloxane with vinyldimethylsiloxy end groups with a viscosity of 10,000 mPa·s (vinyl content: 0.16 wt. %), and the volatile constituents were removed by vacuum treatment in a rotary evaporator for 1 hour with a minimum vacuum of 0.5 mbar and a maximum pot temperature of 190° C. The polymer blend obtained (267 g) with a polyorganosiloxane resin content of 25 wt. % had a viscosity of 7,000 mPa·s at 25° C. (Q and M are as previously defined, and M$^V$ represents a monofunctional unit in which one R represents a vinyl group)

Example 11

A QMM$^V$ resin/vinyl polymer blend prepared according to Example 10 was used for the production of RTV2 rubber that crosslinks by addition and the mechanical characteristics were determined.

Table 1 contains recipes and characteristics of the RTV2-Add rubber blends obtained.

TABLE 1

| | Parts by Weight | | | |
|---|---|---|---|---|
| Starting Materials | Recipe 1 | Recipe 2 Comparison Example for Example 1 | Recipe 3 | Recipe 4 Comparison Example for Example 3 |
| Vinyl end-capped polydimethyl-siloxane, viscosity 10,000 mPa · s | 75 | 100 | 64 | 70 |
| Fumed silica | 0 | 0 | 21 | 21 |
| QMM$^v$ resin | 25 | 0 | 6 | 0 |
| 1% Pt catalyst | 0.2 | 0.2 | 0.1 | 0.1 |
| Inhibitor | 0.06 | 0.06 | 0.06 | 0.06 |
| H-Functional polydimethylsiloxane Type M$_2$D$_x$D$^H_y$, active H content 4.3 mmoles/g | 5 | 5 | 4 | 4 |
| Viscosity mPa · s | 6500 | 9500 | 47000 | 44000 |
| Mechanical vulcanizate characteristics | | | | |
| Tensile strength (MPa) | 4.4 | 0.6 | 6.0 | 4.4 |
| Ultimate elongation (%) (N/mm) | 190 | 160 | 300 | 300 |
| Hardness (Shore A) | 32 | 22 | 42 | 35 |
| Tear propagation resistance (N/mm) | n.d. | n.d. | 22 | | n.d. = value not determined;
D$^H$ represents a difunctional unit in which one R represents a hydrogen atom.

The improvement of mechanical vulcanizate characteristics of the mixtures containing polyorganosiloxane resins prepared according to the invention compared to the usual characteristics is apparent from Table 1.

Example 12

115 g of water was fed over a period of 1 hour with stirring into a mixture of 318 g (1.53 moles) of tetraethoxysilane, 16.7 g (0.09 mole) of 1,3-divinyltetramethyldisiloxane, 111.8 g (0.69 mole) of hexamethyldisiloxane, 19.8 g (0.034 mole) of tridecafluorooctyltriethoxysilane, and 16.2 g (0.15 mole) of trimethylchlorosilane, with a pot temperature of 70° C. The mixture was then boiled under reflux for 1 hour. 450 g of toluene and 685 g of water were then added with stirring and 976 g of the lower aqueous phase was separated. 390 g of distillate was taken off from the remaining organic phase. After filtration, 300 g of a clear resin solution in toluene was obtained, with a siloxane content of 72 wt. %. 0.45 g of 25% sodium hydroxide solution was then added to 155 g of the resin solution, and it was boiled on a water separator for 2 hours with a maximum pot temperature of 120° C., whereby 20 g of distillate was produced. The mixture was then neutralized by adding 20% hydrochloric acid in portions and an additional 5 g of distillate was taken off. After filtration, 130 g of a 70% resin solution was obtained. The yield was 94%. The resin contained 0.73 wt. % silicon-bonded OH groups and 2 wt. % silicon-bonded EtO groups. The molecular weights measured by gel permeation chromatography (GPC) (polystyrene standard) were 2124 g/mole for Mw and 1600 g/mole for Mn.

Example 13

A QM resin that has tridecafluorooctyl group prepared according to Example 12 was used to produce RTV2 rubbers that crosslink by condensation. Component 1 was prepared in a pressing mixer, then back-diluted with Component 2 and the crosslinking agent was then added. The mechanical characteristics of the product obtained were determined.

Table 2 shows the recipes and characteristics of the RTV2-Cond rubber blends obtained.

TABLE 2

| | Parts by Weight | |
| --- | --- | --- |
| Starting Materials | Recipe 1 | Recipe 2 Comparison Example for Example 1 |
| Component 1 | | |
| α,ω-Dihydroxyoligodimethylsiloxane, viscosity 5000 mPa · s | 35 | 45 |
| QM resin with tridecafluorooctyl groups prepared according to Example 1 2 | 10 | — |
| U.C. CABOSIL M 7 D (a silica filler available from Cabot GmbH, Hanau, Germany), | 30 | 30 |
| Hexamethyldisilazane | 8 | 8 |
| Water | 2 | 2 |
| Component 2 | | |
| α,ω-Dihydroxyoligodimethylsiloxane, viscosity 5000 mPa · s | 35 | 35 |
| Polydimethylsiloxane, viscosity 100 mPa · s | 20 | 20 |
| Crosslinking agent | | |
| 5 wt. % dibutyltin dilaurate 95 wt. % tetraethoxysilane | 7 | 7 |
| Viscosity (mPa · s) | 35 | 40 |
| Mechanical vulcanizate characteristics | | |
| Flow time (min) | 20 | 22 |
| Tensile strength (MPa) | 4.7 | 5.4 |
| Elongation (%) | 450 | 380 |
| Hardness (Shore A) | 25 | 31 |
| Tear propagation resistance (N/mm) | 26 | 26 |

Addition of the polyorganosiloxane resin prepared according to the invention improves both the processing characteristics for blending and the mechanical characteristics of the silicone rubber; in particular the products obtained have a shorter flow time and a lower viscosity than those prepared according to the usual recipe.

Example 14

132 g of water was fed over a period of 1 hour with stirring into a mixture of 354 g (1.7 moles) of tetraethoxysilane, 95 g (0.58 mole) of hexamethyldisiloxane, and 36 g (0.26 mole) of methylvinyldichlorosilane with a pot temperature of 70° C. The mixture was then boiled under reflux for 2 hours. 450 g of toluene and 670 g of water were then added with stirring and the lower aqueous phase (1040 g, 1.6 wt. % hydrogen chloride, density 0.97 g/cm$^3$) was separated. 0.5 g of 25% sodium hydroxide solution was then added to 426 g of the toluene resin solution and 205 g of distillate was taken off over a period of 1 hour. The mixture was then boiled for 1 hour on a water separator with a pot temperature of 120° C. (10 g of distillate). It was then neutralized by adding 20% hydrochloric acid in portions and an additional 10 g of distillate was taken off on a water separator. After filtration, 160 g of a toluene resin solution was obtained, with a siloxane content of 70%. The yield was 93%. The resin contained 0.51 wt. % silicon-bonded OH groups and 2.95 wt. % silicon-bonded EtO groups. The molecular weights measured by gel permeation chromatography (GPC) (polystyrene standard) were 5525 g/mole for Mw and 2515 g/mole for Mn.

Example 15

126 g of water was fed over a period of 1 hour with stirring into a mixture of 354 g (1.7 moles) of tetraethoxysilane, 17.4 g (0.09 mole) of 1,3-divinyltetramethyldisiloxane, 125.3 g (0.77 mole) of hexamethyldisiloxane, and 8 g (0.047 mole) of tetrachlorosilane with a pot temperature of 70° C. The mixture was then boiled under reflux for 2 hours. 450 g of toluene and 675 g of water were then added with stirring and the lower aqueous phase (990 g, 0.6 wt. % hydrogen chloride, density: 0.96 g/cm$^3$) was separated. 386 g of distillate was taken off from 677 g of the toluene resin phase. After filtration, 290 g of resin solution was obtained, with a siloxane content of 72 wt. %. The yield was 87%. The resin contained 2.0 wt. % silicon-bonded OH groups, 3.5 wt. % silicon-bonded EtO groups, and 1.8 wt. % vinyl groups. The molecular weights measured by gel permeation chromatography (GPC) (polystyrene standard) were 1246 g/mole for Mw and 912 g/mole for Mn.

What is claimed is:

1. A method for preparing polyorganosiloxanes containing mono- and tetrafunctional units, comprising:
   a) admixing:
      i) at least one silane having the formula (I):

$$Si(OR)_4 \qquad (I)$$

where R is identical or different and represents a monovalent alkyl group with 1 to 4 carbon atoms, or a partial hydrolyzate thereof;
      (ii) at least one silane having the formula (II):

$$R^1{}_3SiOR \qquad (II)$$

or a hydrolyzate thereof having the formula (III):

$$R^1{}_3SiOSiR^1{}_3 \qquad (III)$$

or both,
      where R is as defined above, and $R^1$ is identical or different, and represents hydrogen or a hydrocarbon group of 1 to 18 carbon atoms wherein said hydrocarbon group is selected from the group consisting of branched, unbranched, saturated, unsaturated, substituted, unsubstituted, linear, cyclic, aliphatic and aromatic hydrocarbon groups; and
      iii) at least one monomeric or oligomeric compound or both that has at least one SiCl group, to form a mixture of i), ii) and iii), and reacting said mixture with an equivalent amount of water based on the hydrolyzable groups to form a homogenous reaction mixture; and
   b) adding water, or a solvent immiscible with water or a mixture of both, thus separating the homogenous reaction mixture into two phases, which are an aqueous phase and an organic phase containing a polyorganosiloxane resin,
   wherein the monomeric compound having at least one SiCl group is methylvinyldichlorosilane, and the oligomeric compound having at least one SiCl group has the formula (V):

$$Cl_a(R^1)_{3-a}Si(OSiR^1{}_2)_mOSi(R^2)_{3-b}Cl_b \qquad (V)$$

wherein $R^2$ represents trimethylsiloxy or alkyldimethylsiloxy, wherein the alkyl group optionally contains $OR^1$ or $R^1$ substituents, or both, m has a value of between 0 and 1000, and a and b independently of one another has a value between 0 and 3, provided that (a+b) is at least 1.

2. The method of claim 1, wherein the content of silicon-bonded Cl groups in the starting mixture is 0.1 to 5 wt %.

3. The method of claim 1, wherein the mixture in step a), contains at least one silane having the formula (VI):

$$R^1{}_xSi(OR)_{4-x} \qquad (VI)$$

a partial hydrolyzate or mixture thereof wherein $R^1$ and R are as defined above and x is 1 or 2.

4. The method of claim 3, wherein the silane having the formula (VI) is present in an amount of 0.01 to 10 wt %.

5. The method of claim 1, further comprising separating the aqueous alcohol phase and dissolving the polyorganosiloxane resin in a solvent immiscible with water and removing the water and solids contained in the solvent.

6. The method of claim 1, which further comprises:
   c) adjusting the pH of the separated two-phase reaction mixture to a value of greater than 7 by adding a basic compound and condensing the thus formed mixture with separation of an alcohol/water/solvent mixture to obtain a product; and
   d) neutralizing said mixture by adding an acid or a compound that forms an acid or both; and then removing any water still contained in a portion of the solvent, and separating insoluble constituents therefrom to form a polyorganosiloxane resin solution.

7. The method of claim 6, further comprising:
   e) mixing the polyorganosiloxane resin solution with at least one organosilicon compound having the formula (VII):

$$R^1R^3R^4SiO\text{—}(R^1{}_2SiO)_n\text{—}SiR^1R^3R^4 \qquad (VII)$$

or with at least one organosilicon compound having the formula (VIII):

$$(R^1{}_2SiO)_p \qquad (VIII)$$

or both, wherein $R^3$ and $R^4$ independently of one another are OH or OR or $R^1$, and $R^1$ are as defined above, n has a value of between 0 and 5000, and p has a value between 3 and 8, and the solvent is then completely removed.

* * * * *